Patented Apr. 23, 1929.

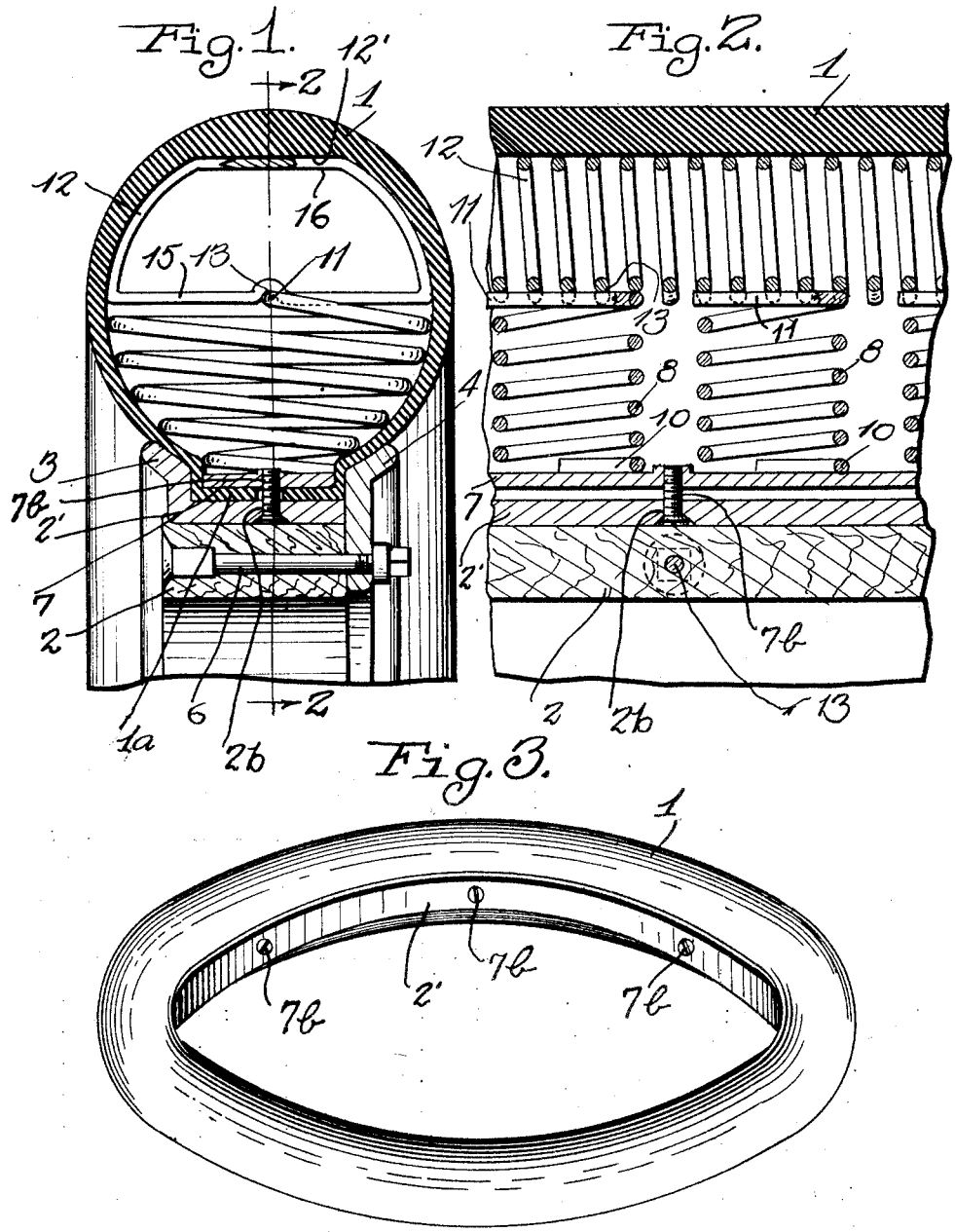

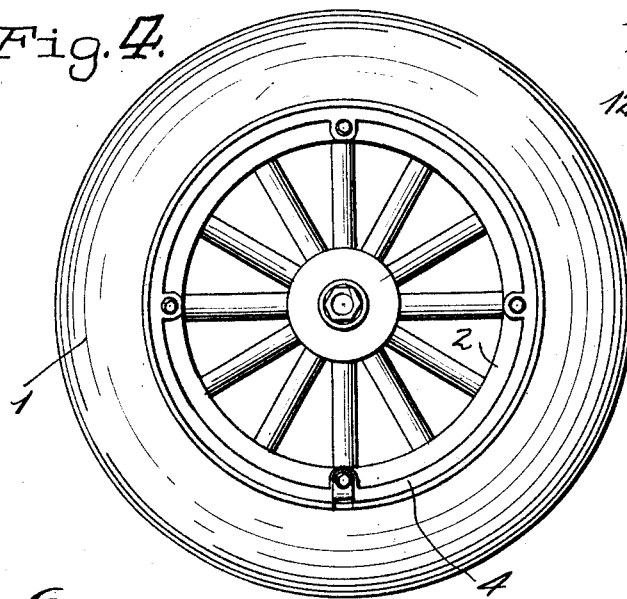
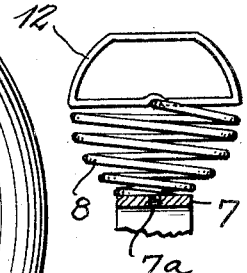
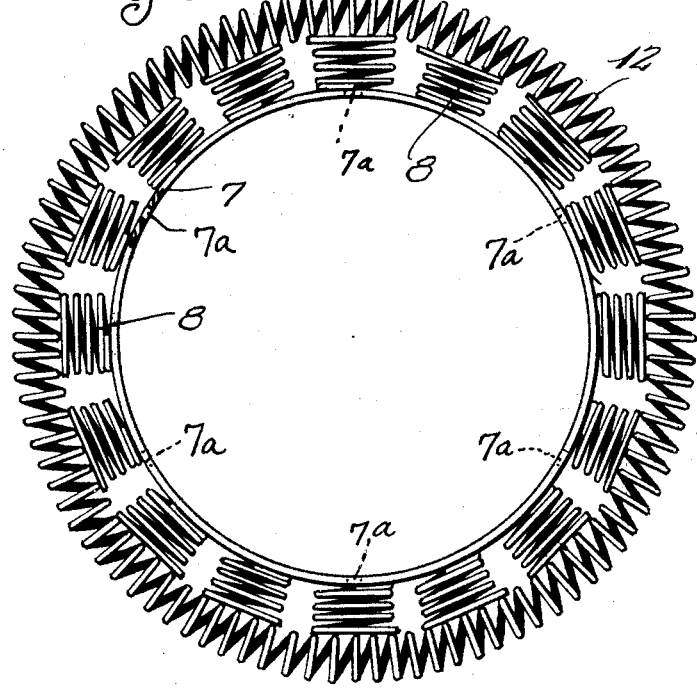
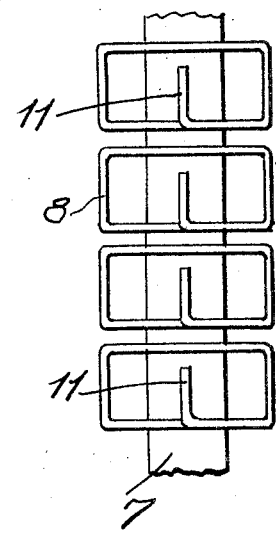

1,710,215

UNITED STATES PATENT OFFICE.

ANDREW HORVÁTH, OF CLEVELAND, OHIO.

SPRING WHEEL.

Application filed August 23, 1928. Serial No. 301,625.

This invention relates to wheels for motor vehicles and has for its object the provision of novel spring constructed equipment for the interior of a non-inflated rubber tire, which will pass the full requisites of resiliency for the purpose of adequately cushioning the tire, and serve as an equivalent for the inflated pneumatic tires now in general use.

The invention consists in the combination with a hollow rubber tire of ordinary construction of cushioning and sustaining springs of peculiar formation and dispositions, the characteristic features of which are a spiral spring arranged concentrically of the tire, fitting its inner wall nearest the tread surface and a series of short springs seated inwardly of the first named spring and supporting the same, whereby the tire will be retained in an expanded condition and interiorly cushioned and supported to a degree approximately the same as that of an inflated pneumatic tire.

In the accompanying drawings which illustrate a tire embodying a preferred construction and arrangement of the cushioning and sustaining devices, Figure 1 is a transverse sectional view of a tire and wheel equipment embodying one form of my invention;

Figure 2 is a sectional view on line 2—2 of Figure 1;

Figure 3 is a perspective view of the tire ready for mounting on a wheel;

Figure 4 is a face view of a wheel mounted tire showing a part of my invention;

Figure 5 is an edge view partly in section of a detached portion of the wheel equipment;

Figure 6 is a side view of a tire filling independently of the tire;

Figure 7 is a diagrammatic view of a part of a modification of the tire filling.

The numeral 2 designates the wooden felly of an automobile wheel of ordinary construction, and 2' the metallic rim to which the tire 1 is attached.

The numerals 3 and 4 are the clamping rings for the tire 1 and 6 are the bolts by which the rings are secured to the felly 2. The numeral 7 is a ring of flat metal which is adapted to embrace the rim of the wheel and constitute a support for a series of radially disposed spiral springs 8 which are inserted within the tire and form parts of the cushioning devices. The ring 7 as shown in Figs. 1, 2 and 7 is inserted in the tire shoe 1, and engages the bead flaps 1ª of the tire, the inner faces of the bead flaps being seated on the rim 2'. The ring 7 is provided with six equi-distantly spaced threaded openings 7ª that are caused to register with similar openings 2ᵇ in the rim 2', while screws 7ᵇ threaded through said openings clamp the bead flaps 1ª between the ring 7 and rim 2'.

The radial springs 8 are each formed with uncoiled terminals 10 and 11 which lie diametrically of the coiled portion and respectively inward and outward of the coils. When these springs are fitted within the tire through its gap portion, they are supported by the split ring 7, at substantially equal distances apart as illustrated in the drawings. The numeral 12 designates a spiral spring in the form of a substantially semicircular coil which, when inserted within the tire, occupies a position above or diametrically outside the springs 8. Each coil of the spring 12 is indented at its inner portion as shown at 13, and forms a recess which receives and holds one of the terminals 11 of the springs 8 and prevent lateral displacement of the latter.

When the tire, with its cushioning springs, is in position and subjected to use, the traction pressure is taken up by the springs which being resilient in circumferential and transverse directions yield under such pressure in various directions and thus respond to the same in a manner similar to that of a pneumatic tire. The recovery from pressure is prompt and certain.

In positioning the parts, the spring 12 is first inserted, it being understood that the spring 12 is dis-continuous in shape. The springs 8 are now inserted and the ring 7 then applied to press the springs 8 against the spring 12. The several parts however may be first assembled as shown in Figure 6 and then inserted in the cavity of the tire.

As illustrated in the drawings, the rubber tire to which the present invention is preferably applied, is of the balloon type, that is of the thickened formation at the tread portion with its walls diminishing in thickness, or tapering towards the inner portion where the gap is formed for the insertion of the springs. Diametrically opposite the tread portion, the inner surface of the tire is flattened as shown at 12' to form a seat for the correspondingly flattened coils of the spring 12, which as shown is of approximately semi-cylindrical formation, with its innermost coil members 15 flattened and running diametrically of a circle describing the outermost arcuate member 15'. The peripheral portions of the coils are flattened as shown at 16. Thus the spring conforms to the circular formation of the bore of the tire, and to the flattened part 12'. The depressions 13 are at the middle points of the coil members 15, near the center of the tire.

The radial coils 8 are so wound as to coincide at their outer margins with the inner curvature of the tire being of increasing diameter from their inner terminals to a point coinciding with the horizontal diameter of the tire. As will be seen the structure and arrangement of the springs is such that the cavity or bore of the tire is relatively filled by the springs. The springs 8 are not however composed of circular coils, but are oval or obloid transversely of the circle defined by the tire, and the tire will therefore accommodate a multiplicity of coils, arranged at close intervals whereby the tire is cushioned at all of its parts, subject to compression or distortion.

As shown in Fig. 7, the radial springs may be bent so as to form coils of substantially rectangular shape by which means their points of contact with the tire will be of greater area, and more effective than where the contact is obtained through a curved part of a spring.

What I claim as new is:—

A cushioning device for resilient hollow tires comprising an interior, circumferentially arranged spiral spring having indentations in its coils, and a series of radial springs having diametrically arranged terminal continuations fitting said indentations and interlocking the parts together.

In testimony whereof I affix my signature.

ANDREW HORVÁTH.